United States Patent
Dekocker et al.

(10) Patent No.: US 12,459,759 B2
(45) Date of Patent: Nov. 4, 2025

(54) PACKAGING SYSTEM FOR ASSEMBLING A PACKAGE

(71) Applicant: Anheuser-Busch InBev S.A, Brussels (BE)

(72) Inventors: Wim Dekocker, Leuven (BE); Annalisa Narducci, Leuven (BE); Keenan Thompson, Leuven (BE); Glenn Ferreira, Leuven (BE); Philippe Jean Marie Duperray, Châteauroux (FR)

(73) Assignee: ANHEUSER-BUSCH INBEV S.A., Brussels (BE)

( * ) Notice: Subject to any disclaimer, the term of this patent is extended or adjusted under 35 U.S.C. 154(b) by 68 days.

(21) Appl. No.: 18/000,733

(22) PCT Filed: Jun. 4, 2021

(86) PCT No.: PCT/EP2021/065010
§ 371 (c)(1),
(2) Date: Dec. 5, 2022

(87) PCT Pub. No.: WO2021/245235
PCT Pub. Date: Dec. 9, 2021

(65) Prior Publication Data
US 2023/0211965 A1    Jul. 6, 2023

Related U.S. Application Data

(60) Provisional application No. 63/034,922, filed on Jun. 4, 2020.

(30) Foreign Application Priority Data

Jun. 4, 2020    (BE) .................................. 2020/5398

(51) Int. Cl.
*B65G 54/02*    (2006.01)
*B65B 43/00*    (2006.01)
(Continued)

(52) U.S. Cl.
CPC .............. *B65G 54/02* (2013.01); *B65B 43/00* (2013.01); *B65B 59/003* (2019.05); *B65B 59/005* (2013.01); *B65B 65/003* (2013.01)

(58) Field of Classification Search
CPC ....... B65G 54/02; B65B 43/00; B65B 59/003; B65B 59/005; B65B 65/003
See application file for complete search history.

(56) References Cited

U.S. PATENT DOCUMENTS 4,169,343 A * 10/1979 McArdle ............... B65B 17/025
53/398
6,868,652 B2    3/2005 Arends et al.
(Continued)

FOREIGN PATENT DOCUMENTS

AT            2159 U1 *  5/1998
AU      6930481 A  *  4/1981
(Continued)

OTHER PUBLICATIONS

IPSearch History Jun. 25, 2025 UTC; InnovationQ+; https://iq.ip.com/discover (Year: 2025).*
(Continued)

*Primary Examiner* — Gene O Crawford
*Assistant Examiner* — Abby A Jorgensen
(74) *Attorney, Agent, or Firm* — ArentFox Schiff LLP (57) ABSTRACT

A packaging system has a system for assembling a package, a method for assembling a package, and a machine for assembling a package. The packaging system comprises at least one main transportation unit and at least one moveable closed loop transportation unit, where the at least one
(Continued)

moveable closed loop transportation unit moves three-dimensionally with respect to the at least one main transportation unit for providing the packaging material components to the main transportation unit and/or performing packaging process operations to a package in assembly present at the main transportation unit. The at least one moveable closed loop transportation unit includes a number of tools mounted on independently motion-controlled movers for providing the packaging material components to the package in assembly and/or providing the packaging operations to the packaging in assembly. In addition to assembling packages, the systems, methods, and machines may also be used for assembly of any other article.

12 Claims, 4 Drawing Sheets

(51) Int. Cl.
    *B65B 59/00*        (2006.01)
    *B65B 65/00*        (2006.01)

(56) References Cited

U.S. PATENT DOCUMENTS

| | | | |
|---|---|---|---|
| 8,903,540 | B2 | 12/2014 | Stork et al. |
| 9,546,049 | B2 | 1/2017 | Lindauer et al. |
| 9,604,792 | B2 | 3/2017 | Wipf |
| 10,150,219 | B2 | 12/2018 | Ridel et al. |
| 10,669,049 | B2 * | 6/2020 | Eberhardt ............. B65B 65/003 |
| 2014/0332352 | A1 * | 11/2014 | Ishikawa ................. B65B 35/00 |
| | | | 198/803.7 |
| 2015/0136564 | A1 * | 5/2015 | Hurni ..................... B65B 57/16 |
| | | | 198/418 |
| 2016/0244273 | A1 * | 8/2016 | Schaeuble ............ B65G 47/763 |
| 2016/0347488 | A1 * | 12/2016 | Ford ......................... B65B 5/08 |
| 2016/0362208 | A1 * | 12/2016 | Papsdorf ................ B65G 47/53 |
| 2020/0147685 | A1 * | 5/2020 | Kremer .................. B33Y 50/02 |
| 2021/0229847 | A1 | 7/2021 | Kalany et al. |

FOREIGN PATENT DOCUMENTS

| | | | | | |
|---|---|---|---|---|---|
| BE | 1023484 | B1 * | 4/2017 | ........... | B28C 9/0463 |
| CA | 1000635 | A * | 11/1976 | | |
| CA | 1052316 | A * | 4/1979 | | |
| CN | 206750770 | U * | 12/2017 | | |
| DE | 102010018153 | A1 | 10/2011 | | |
| DE | 102011016855 | A1 | 10/2012 | | |
| DE | 102011083377 | A1 | 3/2013 | | |
| DE | 202013105022 | U1 | 2/2014 | | |
| DE | 102013111088 | A1 | 4/2015 | | |
| DE | 102016211169 | A1 | 12/2017 | | |
| DE | 202018103487 | U1 | 8/2018 | | |
| DE | 102019115198 | A1 | 12/2020 | | |
| EP | 1123886 | A1 * | 8/2001 | ............. | B65G 54/02 |
| EP | 1462371 | A1 * | 9/2004 | ........... | B65B 61/186 |
| EP | 1803665 | B1 | 5/2009 | | |
| EP | 1530541 | B1 | 7/2009 | | |
| EP | 2338795 | B1 | 10/2012 | | |
| EP | 2746175 | A1 * | 6/2014 | ........... | B65B 61/186 |
| EP | 3045399 | A1 * | 7/2016 | ............. | B65B 51/02 |
| EP | 3105017 | A1 | 12/2016 | | |
| EP | 3317186 | B1 | 7/2019 | | |
| EP | 3577046 | A1 | 12/2019 | | |
| EP | 3405395 | B1 | 7/2020 | | |
| EP | 3181495 | B1 | 11/2020 | | |
| EP | 3778439 | A1 | 2/2021 | | |
| IT | BO20000327 | A1 * | 12/2001 | | |
| WO | WO-2016146213 | A1 * | 9/2016 | ........... | B65G 47/082 |

OTHER PUBLICATIONS

Machine Translation for ITBO20000327 (A1).
International Search Report and Written Opinion for PCT/EP2021/065010 mailed dated Sep. 17, 2021, 11 pages.

* cited by examiner

PACKAGING SYSTEM FOR ASSEMBLING A PACKAGE

FIELD OF INVENTION

The present invention generally relates to transportation units and systems for assembling a package. More particularly, the present invention relates to closed loop transportation units and systems for performing packaging processes in transit and to packaging machine using such units and systems. In addition, the present invention provides also systems, methods, and machines for assembly of any other article.

BACKGROUND OF INVENTION

Transportation systems play a vital and essential part in manufacturing industries for moving components and/or products from one place to another. Small driving vehicles, driving tracks or conveyer belts are conventionally used, where the conveyer belts are run on motors. These driving tracks move trays or containers that carry products to be moved from one place to another.

In particular in packaging assembly lines, linear motion driving tracks are used to move primary, secondary or tertiary packages in assembly for performing packaging operations on them. In order to perform packaging operations on the packages moving in assembly, one or more conventional ways such as manually performing the packaging operations by the human operators while the packages are moving on linear driving tracks are adopted. Another conventional way includes packaging mechanisms along the main driving track, performing packaging operations implemented on stationary tracks, where the packages in assembly move on the driving tracks in a linear motion and remain stationary each time a packaging operation has to occur.

The above mentioned conventional methods lack in one or more features. For example, human operated packaging operations are inefficient and not very productive. Other automated conventional methods lack the possibility to perform packaging operations on the package in assembly while being in transit.

Furthermore, the products handled by these conventional systems are limited to the shapes, weight and other characteristics of the packages to be handled.

In addition, the conventional packaging systems have to change the packaging tools for packaging, depending on the type of product to be packaged, such as its shape, size, and weight and hence, these systems are package specific. This further reduces productivity while decreasing product diversity.

In an attempt to provide a solution enabling packaging operations on the package in assembly while being in transit, WO2019007923A1 provides a particularly flexible processing station for carrying out a work process on an article which is transported by a transport unit of a first conveying means. The invention provides for a process unit to be moved to the article with a transport unit of a second conveying means in the form of a long stator linear motor and for the transport unit to be moved with the first conveying means in the form of a long stator linear motor, wherein the movement of the transport unit of the second conveying means in the overlap region is synchronized, at least sometimes, with the movement of the transport unit of the first conveying means and, during the synchronization of the movements with the process unit, the work process is carried out on the article.

However, still these packaging systems have to change the packaging tools for packaging, depending on the type of product to be packaged, such as its shape, size, and weight and hence, these systems are package specific. This further reduces productivity while decreasing product diversity.

Therefore, it is a first objective of the present invention to enable freedom of package design and "agile flexibility at capacity" via programmable dynamic manufacturing processes that cover exceptionally wide ranges of packages and product, size, shape, format, component and assembly sequences.

It is also an objective of the present invention to realize synchronized, highly flexible, large range, custom manufacturing operations at capacity, while in transit.

It is also an objective of the present invention to provide a recipe driven and/or dynamic packaging system that can implement one or more packaging components and packaging operations or manufacturing operations depending on the type of products to be packaged or operated upon.

It is also an objective of the present invention to migrate to 'whole machine linear drive execution' resulting in maximized packaging efficiency and flexibility.

It is further an objective of the present invention to provide an overall packaging machine which is compact, adaptive, coupled with digitalized solutions, and eliminates a need for change in components or tools specific to packages.

A further objective of the invention includes strong support of tooling adaptability and optimizable, software driven flexibility in the overall packaging machine.

It is also an objective of the present invention to achieve nimble flexibility at capacity for an efficient assembly of an exceptionally wide range of products and package types, shapes, formats and assembly sequences via synchronized, adaptive manufacturing processes in pitch optimized, motion-controlled transit.

Another objective of the present invention includes realization of adaptive manufacturing processes in transit, where the optimizable manufacturing processing is arranged in a multi-module, dynamic, sequential, production processes along a route of a main package transportation linear drive and along which a primary product and packaging material components are loaded and secondary and/or tertiary packages are assembled. This further gives rise to the elimination of an extraordinary degree of package design, format and operational constraints, while conversely enabling exceptional packaging design freedom, operational range, capacity, optimized performance, productivity and cost of ownership benefits.

It is an objective of the present invention to realize "synchronized," motion-controlled manufacturing operations that are operating about base, sides, corners, and tops of the packages while the packages are loaded in pitch optimized transit (variable pitch and speed) through a packaging/manufacturing system, while in addition including consideration of integrated tooling within the independently controlled package transportation carts being transported along the main, pace setting, master linear drive.

Another objective of the present invention includes a modular and programmable execution of the packaging machine with wide dimensional adjustment range (position, height and width of linear drives), and capability for package family tooling, and flexibility in operational sequences and possible dexterities of those tooling that further gives rise to profound freedoms of packaging design.

An additional objective of the invention is to provide a non-conventional, non-traditional packaging machine that is void of the restricted packaging design options and limited formats offered by conventional, commercially available solutions.

SUMMARY OF THE INVENTION

In an aspect of the present invention, a moveable closed loop transportation unit is adapted for providing one or more packaging material components to a main transportation unit and/or performing packaging process operations to a given package in assembly present at the main transportation unit, characterized in that the moveable closed loop transportation unit is 3-dimensionally moveable relative to the main transportation unit.

In an aspect of the present invention, the moveable transportation unit comprises a number of tools mounted on independently motion controlled movers, the tools providing the one or more packaging material components to the given package in assembly and/or providing the packaging process operations to the given packaging in assembly. A mover may support only one tool, but may support several tools as well. In the latter specific case, these tools may each be adapted differently for performing different operations dependent on the operations required, separately, simultaneously, or sequentially. Or one tool may be supported by several movers. In a specific case, individual movement of movers relative to each other and supporting one tool may results in that tool being moved, for example, articulated or retracted, relative to the package in assembly.

In an aspect of the present invention, the tools on the movers are wirelessly controllable and/or wireless, preferably contactless, and even more preferably inductively powered.

An aspect of the present invention provides a system that comprises one or more 3-dimensionally moveable closed loop transportation units as described above and a main transportation unit.

In another aspect a system may be provided that comprises one or more assemblies of at least two 3-dimensionally moveable closed loop transportation units, and a main transportation unit.

Another aspect of the present invention provides a system that comprises one or more moveable closed loop transportation units, and/or one or more assemblies of at least two moveable closed loop transportation units as described above, and a main transportation unit, and further comprising a control system that enables synchronization of the pace and pitch of the tools with the transportation of the package in assembly on the main transportation unit.

In an aspect of the invention, the system comprises one or more moveable closed loop transportation units, and/or assemblies as described above combined with a main transportation unit and the control system that enables synchronization of the pace and pitch of the tools with the transportation of the package in assembly on the main transportation unit and further comprising a control system for enabling the control of the 3-dimensional movement of the moveable closed loop transportation unit relative to the package in assembly. The control system for enabling the control of the 3-dimensional movement may comprises pre-production control of the 3-dimensional movement relative to the package that will be assembled (i.e., recipe driven control) and/or may comprise dynamic control during production as well.

In an embodiment the main transportation unit may comprise independently motion controlled movers supporting a package in assembly and/or supporting tools mounted on the movers.

Further, the main transportation unit may be a closed loop or virtual closed loop as well.

Another aspect of the present invention provides the system as described above, wherein the main transportation unit comprises tools on movers providing packaging process operations to said given packaging in assembly, and wherein the control unit enables the control of the 3 dimensional movement of the closed loop transportation unit, and the main transportation unit, and its respective tools on movers for simultaneously providing one or more packaging material components to the given package in assembly and/or simultaneously providing packaging process operations to said given packaging in assembly.

In another aspect, the above system comprises a plurality of the moveable closed loop transportation units and wherein the control system further enables the control of the 3 dimensional movement of the moveable closed loop transportation units for simultaneously providing one or more packaging material components to said given package in assembly and/or simultaneously providing packaging process operations to said given packaging in assembly.

An aspect of the present invention provides a packaging machine for assembling a packaging comprising one or more moveable closed loop transportation units, and/or an assembly of at least two moveable closed loop transportation units as described above.

Yet another aspect of the present invention provides a packaging machine for assembling a package comprising a system as described above.

It should be appreciated that the above described systems and packaging machines may in addition also comprise any type of intermittent or reciprocating tooling system along the main transportation unit for static, or for single or group (quantity) batch processing.

In an aspect of the present invention, a method for assembling a package is provided that comprises the steps of providing one or more packaging material components onto a 3-dimensionally moveable closed loop transportation unit, transporting said component to a main transportation unit by the moveable closed loop transportation unit, and moving the moveable closed loop transportation unit in a 3-dimensional way relative to the main transportation unit.

In another aspect of the present invention, a method for assembling a package is provided that comprises the steps of providing a given package in assembly onto a main transportation unit, performing packaging process operations to the given package in assembly by a moveable closed loop transportation unit, and moving the closed loop transportation unit in a 3-dimensional way relative to the main transportation unit.

In another aspect of the present invention, the above method for assembling a package wherein the step of providing one or more packaging material components or the step of performing packaging process operations comprises (i) supplying and/or assembling a packaging material component such as a partition, a handle, a panel, a lid, (ii) supplying and/or loading one or more primary articles into a secondary packaging, or supplying and/or loading one or more secondary packages into a tertiary packaging, (iii) moving one or more packaging components or part of it into a given direction, (iv) fixing one or more packaging components to the given package in assembly, (v) rotating the package in assembly or the final assembled package, (vi)

inspecting a package, and or coding a package, (vii) accelerating, decelerating, cutting, stretching, compressing, collapsing, folding, erecting, gluing, decorating a component of a package in assembly, and all combinations thereof.

In an additional aspect of the present invention, a moveable closed loop transportation unit is proposed adapted for providing one or more article component to a main transportation unit and/or performing process operations to a given article in assembly present at the main transportation unit, characterized in that the moveable closed loop transportation unit is 3 dimensionally moveable relative to the main transportation unit.

In addition, a machine for assembling an article is provided comprising at least such moveable closed loop transportation unit.

It should be appreciated that all aspects and embodiments, systems, machines and methods described throughout the whole text in the context of assembling a package may be equally applicable in the context of assembling any other article, and in particular automotive parts, medical devices, toys, and consumer electronics.

DETAILED DESCRIPTION

The present invention provides a packaging system, a packaging method and a packaging machine for assembling a package which includes providing one or more packaging material components and providing packaging process operations to a given package in an assembly.

In an aspect of the present invention, the packaging system comprises of at least one main transportation unit and at least one moveable closed loop transportation unit, where the at least one moveable closed loop transportation unit is moveable in multiple degrees of freedom with respect to the at least one main transportation unit. In a further aspect of the present invention, the at least one moveable closed loop transportation unit is moving in three dimensions, with respect to the at least one main transportation unit, for providing the packaging material components to the main transportation unit and/or performing packaging process operations to a package in the assembly onto the main transportation unit. In an embodiment, the at least one moveable closed loop transportation unit is able to move in three-dimensions with respect to the at least one main transportation unit. The moveable closed loop transportation unit is able to move along a vertical axis (Z), e.g., variability in height relative to the main transportation unit, along a horizontal axis (X), e.g., variability in position in a direction parallel to the main transportation unit machine direction, and along a second horizontal axis (Y), e.g., variability in position in a direction perpendicular to the main transportation unit machine direction.

In a further embodiment, the at least one moveable closed loop transportation unit may in addition be able to incline, or to tilt, or to rotate around one or more of the X, Y, Z axes (often referred to as pitch, yaw, and roll) and all combinations thereof.

The 3-dimensional movement may also include docking in case a moveably closed loop transportation unit is not required for a specific type of package assembly, or in case it needs maintenance or repair.

It may be apparent to a person with ordinary skill in the art that the "closed loop" transportation unit in the packaging system includes not only linear drives (or so-called linear motors), but all types of closed loop conveying systems or virtual closed loop systems, enabling independent motion control of its movers in a closed loop or a virtual closed loop.

Further the 3-dimensionally moveable closed loop transportation unit may comprise a movement system for moving relative to the main transportation unit. Such movement system may comprise any type of movement system enabling the 3-dimensional movements described above, as for example rails or tracks or slides or linear motors or robotics, or overhead frames or overhead robots, stand-alone or integrated with the main transportation unit, or integrated in a packaging system frame or packaging machine frame.

In an aspect, the present invention provides a system comprising one or more of such three-dimensionally moveable closed loop transportation units, and a main transportation unit. These moveable closed loop transportation units may be serially positioned relative to the main transportation unit, i.e., one after the other along the main transportation unit, or may be positioned in parallel, i.e., at least at two sides of the main transportation unit in a direction perpendicular to machine direction thereby surrounding a same part of the main transportation unit at least from two sides, or any combination of serial and parallel.

Figure 3:
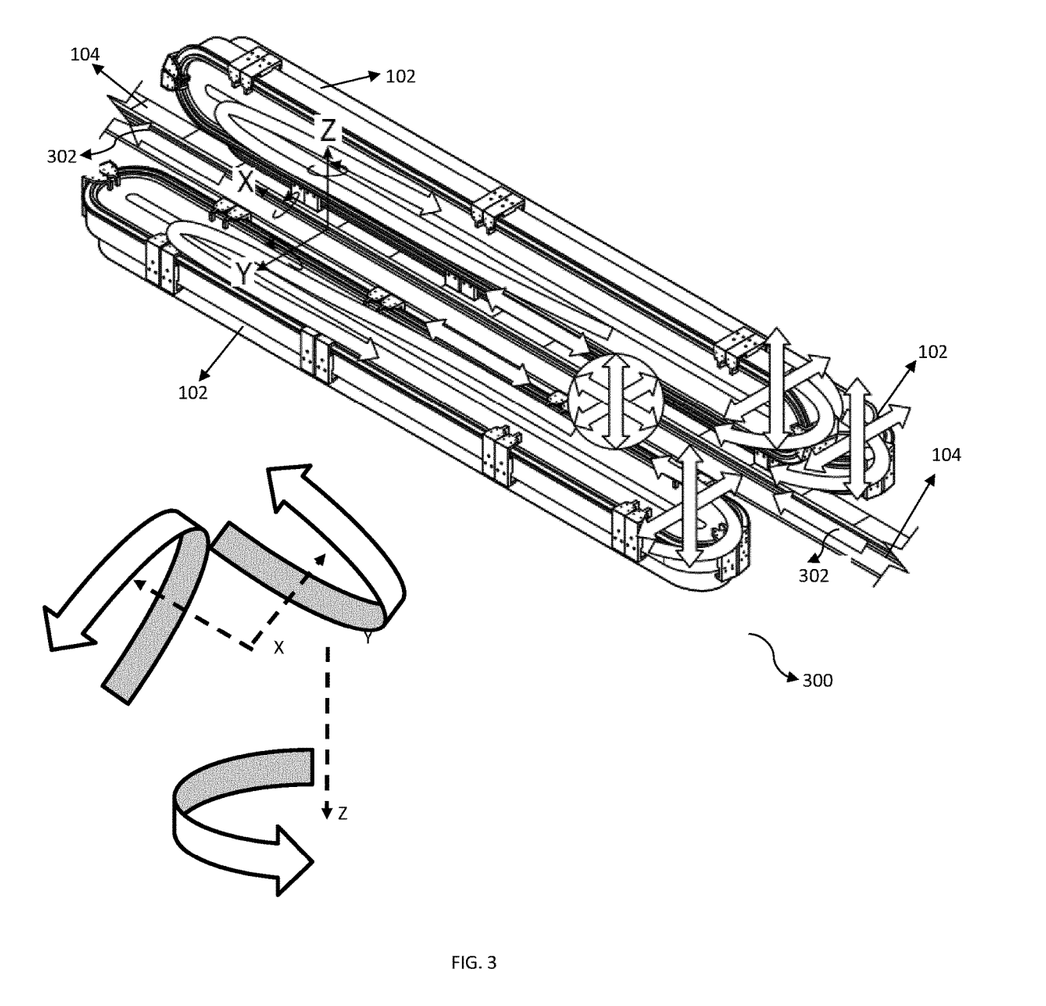
FIG. 3 illustrates a section of the adaptive packaging system showing multiple moveable closed loop transportation units situated around one main transportation unit surrounding a part of the main transportation unit from three dimensions, in accordance with an embodiment of the present invention.

In an embodiment as illustrated in FIG. 3, the packaging system may comprise an assembly of at least two moveable closed loop transportation units being situated around a same part of the main transportation unit and surrounding said part of the main transportation unit at more than one side (e.g., three moveable closed loop transportation units enveloping part of the main transportation unit at top, left and right. At least one and preferably more than one, and most preferably all moveable transportation units in such configuration are able to move in three dimensions independently of each other and relative to the main transportation unit. In a preferred embodiment, the more than one moveable closed loop transportation units surrounding a part of the main transportation unit are able to separately or simultaneously move along a vertical axis (Z), e.g., variability in height relative to the main transportation unit, along a horizontal axis (X), e.g., variability in position in a direction parallel to the main transportation unit machine direction, and along a second horizontal axis (Y), e.g., variability in position in a direction perpendicular to the main transportation unit machine direction. In addition, the at least two moveable closed loop transportation units surrounding the main transportation unit may be able to separately or simultaneously incline, or tilt, or rotate around one or more of the X, Y, Z axes (often referred to as pitch, yaw, and roll) and all combinations thereof.

In other embodiments of the present invention, the packaging system may also include at least three moveable transportation units enveloping the main transportation unit from at least three sides, inclined to the main transportation unit at any suitable angle, situated at any suitable distance from the main transportation unit and moving independently in three dimensions with respect to the main transportation unit, thereby covering movement about the main transportation unit in maximum degrees of freedom, giving the packaging system enormous flexibility in performing operations on the packages in transit on the main transportation unit, without deviating from the meaning and scope of the present invention.

Preferably, the tools on the movers of both the moveable closed loop transportation unit and preferably also the main transportation unit are contactless, preferably inductively, powered. Furthermore, these tools may be wirelessly controllable via a remote control unit or a control system.

One moveable closed loop transportation unit comprises movers onto which a number of tools are mounted, where the mover is coupled with the moveable closed loop transportation unit. In an embodiment of the present invention, the mover is magnetically coupled with the moveable closed loop transportation unit in a contactless manner. In this embodiment, the moveable closed loop transportation unit may have electrical coils, while the mover may be equipped with a permanent magnet for creating an electromagnetic field between the moveable closed loop transportation unit and the mover. In an embodiment, the moveable closed loop transportation unit may be implemented with inductive cables from which inductive power is transmitted via the movers to the tools.

At least one tool is coupled with a mover for handling packaging material components. The tool is also inductively powered via the mover. The tools provide the packaging material components to a package in assembly and perform packaging process operations to the package in the assembly, while the package is in transit onto the main transportation unit. Since the moveable closed loop transportation unit is inductively controlled, a power coil that is equipped with the moveable transportation unit builds electromagnetic forces. Therefore, the mover moves freely, in a flying motion over the moveable closed loop transportation unit under the effect of electromagnetic forces generated due to the electromagnetic coil in the moveable closed loop transportation unit and the permanent magnet in the mover.

The linear drive of the moveable closed loop transportation unit and the main transportation unit is achieved by a linear drive motor, which can also be remotely controlled. Further, the control system controls the movement of the moveable closed loop transportation unit around the main transportation unit. For example, the control system controls the three-dimensional movement of the moveable closed loop transportation unit relative to the main transportation unit.

Additionally, the operations of the movers and the tools may also be remotely controlled. In an embodiment, for remote controlling the operations of the movers and the tools, one or more wireless communication protocols may be implemented, such as including but not limited to short range wireless, such as Bluetooth, Infrared, or WLAN, WAN, or Internet protocols and the like.

In an aspect of the present invention, the packaging system, the packaging method, and the packaging machine may also be implemented to a range of manufacturing operations, such as tool handling, or tool operations done on a material component, and the like.

The moveable closed loop transportation unit may also be referred to as 'moveable transportation unit' and the main transportation unit may also be referred to as 'main transportation unit' in the entire disclosure, without deviating from the meaning and scope of the present invention.

Figure 1:
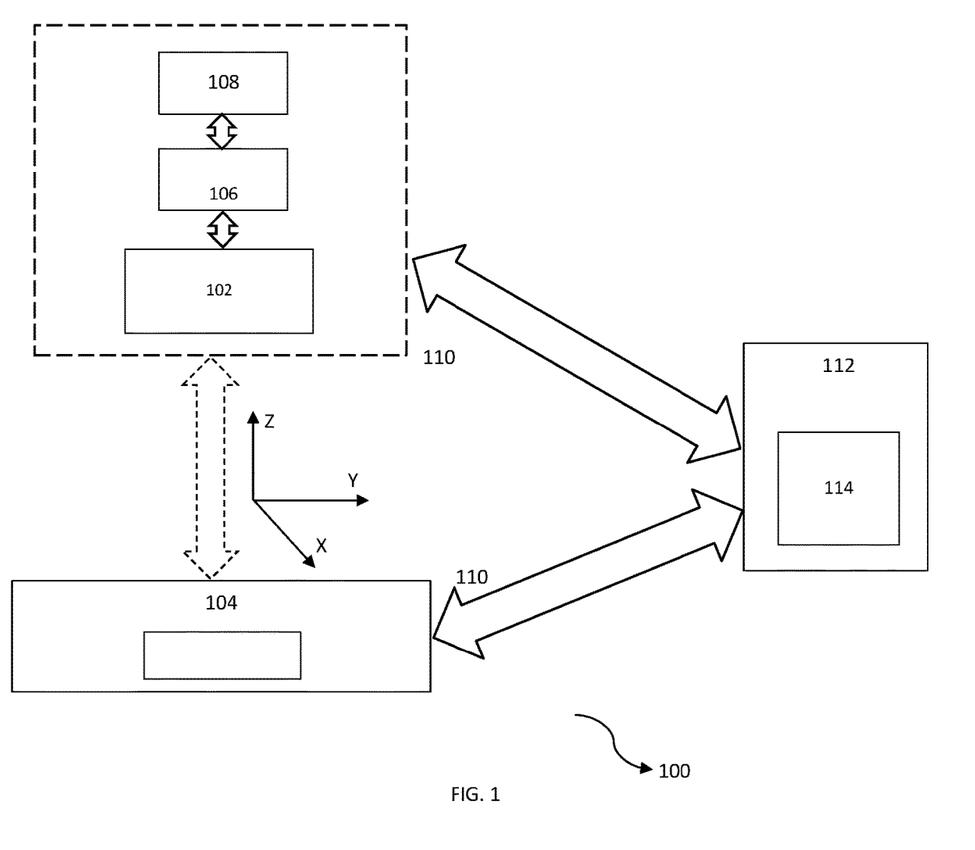
FIG. 1 illustrates an exemplary environment of a moveable closed loop transportation unit moving with respect to a main transportation unit, in accordance with an embodiment of the present invention.

FIG. 1 illustrates an exemplary environment of a moveable closed loop transportation unit moving with respect to a main transportation unit, in accordance with an embodiment of the present invention. An adaptive packaging system 100 comprises of a moveable closed loop transportation unit 102 (referred to as 'moveable transportation unit' 102); a main transportation unit 104 (referred to as 'main transportation unit' 104) and a central computer 112, where the moveable closed loop transportation unit 102 is able to move within three dimensions (X, Y, Z) with respect to the main transportation unit 104.

At least one tool is coupled with the mover for handling packaging material components. The tool is also inductively powered via the mover. The tools provide the packaging material components to a package in assembly and perform packaging process operations to the package in the assembly, while the package is in transit onto the main transportation unit. Since the moveable closed loop transportation unit is inductively controlled, a power coil that is equipped with the moveable transportation unit builds electromagnetic forces. Therefore, the mover moves freely, in a flying motion over the moveable closed loop transportation unit under the effect of electromagnetic forces generated due to the electromagnetic coil in the moveable closed loop transportation unit and the permanent magnet in the mover. As the mover moves in the contactless manner, the tools mounted are also inductively powered via the movers and come into motion while being mounted on the movers.

The drive system of the moveable closed loop transportation unit and the main transportation unit may comprise a linear motor. Further, the control system controls the movement of the moveable closed loop transportation unit around the main transportation unit. For example, the control system controls the three-dimensional movement of the moveable closed loop transportation unit relative to the main transportation unit.

Additionally, the operations of the movers and the tools may also be remotely controlled. In an embodiment, for remote controlling the operations of the movers and the tools, one or more wireless communication protocols may be implemented, such as including but not limited to short range wireless, such as Bluetooth, Infrared, or WLAN, WAN, or Internet protocols and the like.

In an aspect of the present invention, the packaging system, the packaging method and the packaging machine may also be implemented to a range of manufacturing operations, such as tool handling, or tool operations done on a material component, and the like.

The moveable closed loop transportation unit may also be referred to as 'moveable transportation unit' and the main transportation unit may also be referred to as 'main transportation unit' in the entire disclosure, without deviating from the meaning and scope of the present invention.

FIG. 1 illustrates an exemplary environment of a moveable closed loop transportation unit moving with respect to a main transportation unit, in accordance with an embodiment of the present invention. An adaptive packaging system 100 or an adaptive packaging system 100 comprises a moveable closed loop transportation unit 102, a main transportation unit 104, and a central computer 112, where the moveable closed loop transportation unit 102 is able to move within three-dimensions (X, Y, Z) with respect to the main transportation unit 104.

Both the units have preferably linear drives actuated by linear drive motors. FIG. 1 shows single transportation units (102 and 104) which are highly integrated and are flexible to be in use for layout configurations. Multiple moveable transportation units 102 together and multiple main transportation units 104 may be integrated together to configure layouts of linear driving tracks or linear drives.

The moveable closed loop transportation unit 102 provides packaging material components to the main transportation unit 104 for performing packaging operations on a package in transit onto the main transportation unit 104. The packaging material components provided by the moveable closed loop transportation unit 102 may include and is not limited to primary packaging (such as bottles, cans, kegs, etc.) or components thereof (such as lids, caps, labels, etc.), secondary packaging (such as boxes, cartons, crates, etc.) and components thereof (such as foldable packaging blanks, handle assemblies, partitions, reinforcement pieces, ribbons, etc.), or tertiary packaging (such as pallets, etc.) or components thereof (such as foils, etc.). And the package in assembly in transit onto the main transportation unit 104 may include primary packaging (such as bottles, cans, kegs, etc.), secondary packaging (such as boxes, cartons, crates, etc.), or tertiary packaging (such as pallets, etc.).

A moveable transportation unit 102 is highly integrated and is flexible to be used for various layout configurations. Multiple moveable transportation units 102 may be integrated together to configure a moveable driving track. One moveable transportation unit 102 includes a mover 106, a tool 108, a sensor unit for detecting position of a mover 106 or a tool 108 mounted over it, and flat coils to generate traveling magnetic field for the mover 106 and/or tools 108 to travel over it. The moveable transportation unit 102 may also be able to communicate with a central computing device 112 or a control system 112 via a communication channel 110. The central computing device 112 controls the three-dimensional movement of the moveable transportation unit 102 relative to the main transportation unit 104. The central computing system 112 further enables the control of the 3-dimensional movement of the moveable transportation unit 102 for simultaneously providing one or more packaging material components to a given package in assembly and/or simultaneously performing packaging process operations on the given packaging in the assembly.

The mover 106 mounted over the moveable transportation unit 102 moves contactless, under the effect of electromagnetic forces, over the moveable transportation unit 102. The mover 106, the tools 108 and the moveable transportation unit 102 are inductively powered.

The central computing device 112 may be a local or a remote controlling device for controlling the operations of the moveable transportation unit 102 and the mover 106 and the tool 108 mounted over it. In an embodiment for wireless operation control of the mover 106 and the tool 108, the mover 106 is equipped with an antenna for wireless communication via wireless communication links such as WLAN or WAN etc. Each moveable transportation unit 102 of the mover 106 and the tool 108 may form a dedicated wireless network within which the mover 106 and the tool 108 and the moveable transportation unit 102 may be wirelessly controlled via a data transmission cable following the closed loop or virtual closed loop. Further, in an embodiment, the tools 108 may be independently wirelessly controlled within their own dedicated wireless network.

The central computing device 112 may be any computing device such as including and not limited to a desktop computer, a laptop, a smart phone, a mobile phone, an information pad, a tablet, a phablet, and the like.

The moveable transportation unit 102 communicates bidirectionally with the central computing device 112 via the communication channel 110, for example a communication fieldbus 110. The central computing device 112 is installed with a software application 114 that monitors, controls and optimizes operations of the overall packaging system 100, including the moveable transportation unit 102, the main transportation unit 104, the mover 106 and the tool 108.

The software application 114 may analyze the positioning measurements of the mover 106 and the tools 108 and provide optimized paths, or positioning, or track management functions for the overall packaging system 100 (including the moveable transportation unit 102, the main transportation unit 104, the mover 106 and the tool 108) to the computing device 112, to further monitor and control the position and movements of the mover 106 and the tools 108 over the moveable transportation unit 102. The computing device 112 also enables synchronization of the pace and pitch of the tools 108 with the pace and pitch of the transportation of the package in assembly on the main transportation unit 104.

The main transportation unit 104 provides packages in assembly while in transit. The packages in transit on the main transportation unit 104 are to be provided with the packaging operations by the packaging material components provided by the mover 106 and tool 108 of the moveable transportation unit 102, while the moveable transportation unit 102 moves three-dimensionally along/around the main transportation unit 104.

Further, the main transportation unit 104 also bi-directionally communicate with the computing device 112 in the same way as the computing device 112 communicates with the moveable transportation unit 102. The main transportation unit 104 is controlled by the computing device 112 via wired or wireless protocols, similarly as with the moveable transportation unit 102. The application 114 can provide optimized paths, or positioning, or track management functions for both the packages moving over the main transportation unit 104 and/or the main transportation unit 104 itself, to the computing device 112, to further monitor and control the position and movements of the packages over the main transportation unit 104.

In an embodiment of the present invention, the main transportation unit 104 may also have one or more movers (similar to mover 106 or may be different), and one or more tools mounted over the movers (similar to tool 108 or different). The movers of the main transportation unit 104 may provide packaging process operations to a given packaging in an assembly, and the central computing device 112 controls the 3-dimensional movement of the moveable transportation unit 102, along with controlling the movement of the main transportation unit 104, and its respective tools on the movers for simultaneously providing one or more packaging material components to the given package in the assembly and/or simultaneously providing packaging process operations to the given package in the assembly.

In an embodiment of the present invention, the linear drive of the moveable transportation unit 102 is parallel to the linear drive of the main transportation unit 104, which may act as the master of the packaging system 100. In another embodiment of the present invention, the linear drive of the moveable transportation unit 102 may be inclined at an angle with respect to the linear drive of the main transportation unit 104, for example, the moveable transportation unit 102 may be tilted or inclined at an angle to the main transportation unit 104. In another embodiment, the moveable transportation unit 102 may be situated at any suitable distance from the main transportation unit 104.

Figure 2:
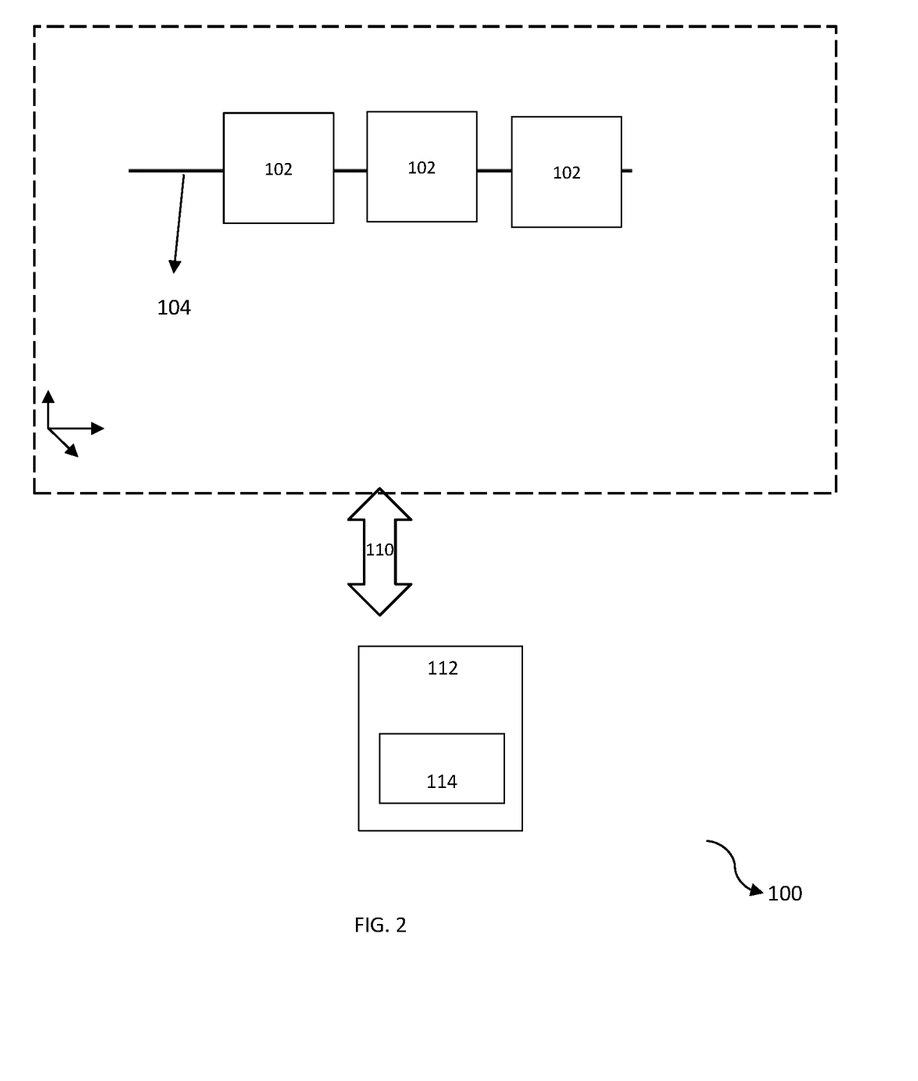
FIG. 2 illustrates an exemplary environment of an adaptive packaging system including a number of moveable closed loop transportation units moving with respect to a main transportation unit, in accordance with an embodiment of the present invention.

As an example, for assembling secondary packages dynamically (while in transit), the packaging system 100 may perform the following process steps:

(a) Carton Blank Supply on the main transportation unit 104
  I. Carton Pre-Feed,
  II. Carton Magazine,
  III. Carton De-nesting (Picking, Alignment, Shingling, Transfer to Main Linear Drive Cart, Delivery;
(b) Primary Product Supply on the moveable transportation unit 102
  I. Primary Product Pre-Feed,
  II. Primary Product Picking (Position & Orientation Scanning, Dynamic Picking, Orientation, Grouping, Pitching & Transfer to Intermediate Mat Conveyor Table),
  III. Primary Product Grouping (Collated Group Picking and dynamic transfer and delivery onto Base Panel of Carton Blank in transit on the main transportation unit 104 or Main Transfer System Cart;
(c) 24 Pack Handle Reinforcement
(d) Laser Knick Cutting
  (e) Erection Glue Application
  (f) U-Forming
(g) Partition Supply
  I. Partition Pre-Feed,
  II. Partition Magazine,
  III. Partition De-nesting (Picking, Erection, Forming, Transfer and Insertion);
(h) Handle Supply
  I. Handle Pre-Feed,
  II. Handle Magazine,
  III. Handle De-nesting (Picking, Transfer and Placement);
(i) Carton Erection (End Closing)
  (j) Filled Pack Inspection
  (k) Closing Glue Application 1 & 2
(l) Carton Closing
  (m) Pack Rotation (Basket) [Optional]
  (n) Ribbon Supply [Optional]
  I. Ribbon Pre-Feed,
  II. Ribbon Magazine,
  III. Ribbon De-nesting (Picking, Forming, Transfer and Application);
(o) Finished Pack Inspection
  (p) Carton Coding
  (q) Pack Grouping [Optional] or Pack Discharge FIG. 2 illustrates an exemplary environment of the adaptive packaging system including multiple moveable transportation units 102 moving with respect to a main transportation unit, in accordance with an embodiment of the present invention. The adaptive packaging system 100 includes multiple moveable transportation units 102 and a main transportation unit 104. The moveable transportation units may be supported off a basic machine frame over a main transportation unit 204.

A highly adaptable, programmable, dynamic manufacturing platform, such as the adaptive packaging system 100, comprises multiple modules of moveable closed loop transportation units 102 which are position settable in three dimensions and operate opposite the main transportation unit 104. In an embodiment, the three-dimensional movement of the moveable transportation units 102 may include and is not limited to a vertical axis, e.g., movement along height from the packages in transit on the main transportation unit 104, and along with two horizontal axes, e.g., position and width relative to the packages in transit on the main transportation units 104.

The modules of moveable closed loop transportation units 102 which are position settable in three-dimensions operate opposite the linear drive of the main transportation units 104. All the independent position and motion-controlled movers 106, of the moveable transportation units 102 of which support and transport are in controlled synchronized motion, are contactless powered and synchronized, while also being wirelessly (untethered) automation controlled. The movers 106 have custom tools 108 and/or related tooling processes which are acting on and about the package being assembled while in likewise synchronized motion-controlled transit on the main transportation units 104.

The adaptive packaging system 100 comprises multiple modules of programmable robotic custom tools (108) which are mounted on the one or more motion-controlled movers (106) of position adjustable linear drives of the moveable transportation unit 102. The moveable transportation unit 102 being configured and optimally controlled to work on and assemble the packages while following the motion profile of the main transportation unit 104 and hence traveling with the package being assembled at the main transportation unit 104.

As mentioned above, the modules of the tools (108) mounted over the movers (106) of the moveable transportation unit 102 moves three-dimensionally relative to the linear drives of the main transportation unit 104. This further means that the position of each moveable transportation unit 102 or the module 102 can be adjusted relative to the positions of the packages in transit on the main transportation unit 104 and also relative to the linear drive of the main transportation unit 104. The position adjustable features of the linear drive mounted tools 108, the movers 106 and the moveable transportation unit 102 include position adjustment in three dimensions, such as position adjustment along vertical height above a carton support cart deck which is in transit on the main transportation unit 104, while also along the width between tracks of the moveable transportation unit 102 and the main transportation unit 104, and along absolute horizontal position relative to the main transportation unit datum (in machine direction). These position adjustable features of the moveable transportation unit 102 provide dimensional range of the machine that when combined with compatible mover 106 and tooling 108 enable exceptional ranges of packaging sizes and formats to be accommodated and optimally produced.

The adaptive packaging system 100 is an amalgamation of various technologies that provide capabilities to the adaptive packaging system 100. Such as, the adaptive packaging system 100 includes the main transportation unit 104, which transits independent packages on a transportation linear drive, and has pace setting features. The adaptive packaging system 100 further includes multiple modules or units of position adjustable "manufacturing process" linear drives which are moveable transportation units 102. The adaptive packaging system 100 furthermore includes movers 106, where the movers 106 of each moveable transportation units 102 have their motion profiles being synchronized with the motion profile of the main transportation unit 104.

The adaptive packaging system 100 further includes contactless (untethered) inductive power provided to the movers 106. Also, the adaptive packaging system 100 enables wireless (untethered) automation control communication with the movers 106 by using the central computing system 112. The adaptive packaging system 100 also includes integrated tooling within the independently controlled package transportation carts being transported along the main transportation unit 104.

Hence, the realization of the "synchronized," untethered, motion-controlled manufacturing operations, using the movers 106 and the mounted tools 108, operating about the base, sides, corners, and tops of the packages while the packages are in pitch optimized transit (variable pitch and speed) on the main transportation unit 104 through the adaptive packaging system 100, is achieved by the integrated amalgamation of the various technologies which are integrated in the main transportation unit 104, the moveable transportation unit 102, and its movers 106 and the tools 108. Thus, the adaptive packaging system 100 has synchronized, motion-controlled manufacturing operations, performed by the movers 106 and the tools 108 of the moveable transportation units 102, occurring all about packages in transit, where the packages in transit on the main transportation units 104 are themselves being transported in a motion-controlled manner, i.e., not constant velocity and not constant pitch.

Such a highly programmable adaptive packaging system 100, where strokes, motion profiles, cams, pitches and sequences etc. are all programmable, may execute optimized packaging operations across an exceptionally broad range of package formats (width, length, height), shapes, stylings, and forms. This, coupled with tooling (such as tool 108) exchanges and associated software, further expands the capabilities of the manufacturing platform, such as the adaptive packaging system 100.

Each device or component in the adaptive packaging system 100 is controlled or automated by the central computing system 112 via the software application 114 that controls operations of the adaptive packaging system 100. The automation software application 114 controls the synchronized motion and action-controlled movement of all devices in the adaptive packaging system 100. In an embodiment, the adaptive packaging system 100 includes an automated changeover of sets of mover and tools for families of package styles i.e., package specific change in parts (e.g., mover and tools) is not required. The automated changeover is controlled by the automation software application 114.

In an embodiment, the adaptive packaging system 100 includes automated (or semi-automated) docking of subassembly aggregates or complete AGV (Automatic Guided Vehicle) directed modules is controlled by the automation software application 114. In this embodiment, the adaptive packaging system 100 may include exchange of whole modules of the moveable transportation units 102 about the main transportation system (204) loop, and not just the exchange of movers 106 and the tools 108. The modules may be mobile AGV units which may be summoned from a remote location such as a parking location to the system 100, to automatically locate, dock, connect and integrate the modules into safety systems, with their synchronized automation control. The reverse procedure would be applied at undocking. Such system (e.g., adaptive packaging system 100), coupled with dockable aggregates, would largely cut the constraint concerning the type of configuration the packaging machine was originally ordered, making it more adaptable, versatile, and future proof In an embodiment, the machine 200 may include a linear drive track 202 comprising a plurality of moveable transportation units 102 moving and working, three dimensionally, around a linear drive track 204 comprising a plurality of multiple main transportation units 104. In another embodiment, the machine 200 may include more than one linear drive track (such as the linear drive track 202) each comprising a plurality of moveable transportation units 102 moving and working, three dimensionally, around a linear drive track 204 that comprises a plurality of multiple main transportation units 104.

In an embodiment, all the software-controlled devices in the adaptive packaging system 100 may be re-programmed and exchanged or upgraded to suit a broad range (family) of products being produced, thus ensuring the adaptive packaging system 100 remains relevant and suitable for optimized production.

The adaptive packaging system 100 has performance, range, agile flexibility, adaptability and productivity enhancement, as a result of migrating to whole machine linear drive execution, instead of a linear drive in a conventional machine.

The linear drive mover 106 and/or tooling (108) are custom processed, which further are powered and controlled without necessarily being tethered pneumatically, electrically, or mechanically to the main machine (e.g., the linear drive of the moveable transportation unit 102 or main transportation unit 104) because the mover 106 has contactless coupling with the moveable transportation unit 102 under the effect of electromagnetic forces.

FIG. 3 illustrates a section of the adaptive packaging system showing multiple moveable closed loop transportation units situated around one main transportation unit (the main transportation unit of the adaptive packaging system) surrounding the main transportation unit from three dimensions, in accordance with an embodiment of the present invention. The section 300 of the transportation system 100 comprises three moveable transportation units 102 situated around one main transportation unit 104, enveloping the main transportation unit 104 from three sides of the main transportation unit 104, such as top, left and right. The main transportation unit 104 may act as the master of the transportation system 100, and the packages in transit on the main transportation unit 104 move in the machine direction as shown by the arrow 302.

Each of the three moveable transportation units 102 is able to move in three dimensions independently of each other. In other words, the three moveable transportation units 102 are able to move in three dimensions or three axes, X-, Y-, and Z-axes with respect to the main transportation unit 104. Optionally the three moveable transportation units 102 may also be moveable in machine direction 302 or may move opposite machine direction 302. Or it may also be the case, in an embodiment, out of the three moveable transportation units 102, one or two moveable transportation units 102 move in the machine direction 302 while the rest move opposite the machine direction 302, depending on the requirement and design of the transportation system 100, without deviating from the meaning and scope of the present invention.

It may be apparent to a person ordinary skilled in the art that the packaging system may also include at least three moveable transportation units 102 enveloping the main transportation unit 104 from at least three sides, inclined to the main transportation unit 104 at any suitable angle, situated at any suitable distance from main transportation unit 104 and moving independently in three dimensions with respect to the main transportation unit 104, thereby covering movement about the main transportation unit 104 in maximum degrees of freedom, giving the transportation system 100 enormous flexibility in performing operations on the packages in transit on the main transportation unit 104, without deviating from the meaning and scope of the present invention.

Thus, the adaptive packaging system 100 is highly flexible and dynamic by including any suitable number of moveable transportation units 102 around the main transportation unit 104, where the moveable transportation units 102 are capable of having their independent movement in three-dimensions with respect to the main transportation unit 104, and being able to be situated at any suitable distance in any direction and any suitable inclined or parallel or non-parallel (under rotation angle) position with respect to the main transportation unit 104. Therefore, the moveable transportation units 102 are capable of providing packaging components and packaging operations to the packages in transit on the main transportation unit 104 in multiple degrees of freedom of movement.

Figure 4:
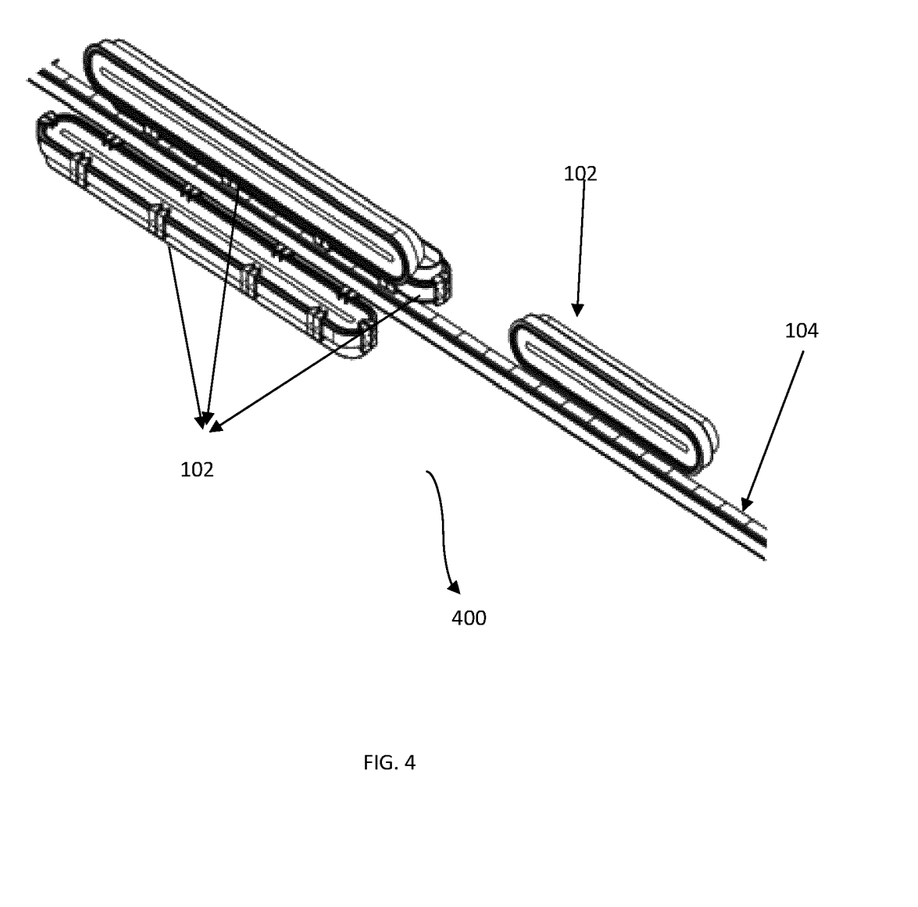
FIG. 4 illustrates a schematic floor plan of the packaging system, in accordance with an embodiment of the present invention

FIG. 4 illustrates a schematic floor plan of the transportation system 100, in accordance with an embodiment of the present invention. The schematic floor plan 400 shows the transportation system 100 that includes the main transportation unit 104, which may act as the master of the transportation system 100, and multiple moveable transportation units 102 which are three dimensionally moveable with respect to the main transportation unit 104. Also, as shown in the FIG. 4, the multiple moveable transportation units 102 are placed at various angles or positions with respect to the main transportation unit 104 and are position settable with six degrees of freedom such that the moveable transportation units 102 are able to perform packaging operations, in three dimensions and in multiple degrees of freedom, at the packages in transit onto the main transportation unit 104. Therefore, the transportation system 100 is able to achieve maximum degree of flexibility and dynamic in providing the packaging operations to the packages in transit onto the main transportation unit 104.

In an embodiment of the present invention, the linear drive of the moveable transportation unit 102 is parallel to the linear drive of the main transportation unit 104, which may be the master of the transportation system 100. In another embodiment of the present invention, the linear drive of the moveable transportation unit 102 may be inclined at an angle with respect to the linear drive of the main transportation unit 104. For example, the moveable transportation unit 102 may be tilted or inclined at an angle to the main transportation unit 104. In another embodiment, the moveable transportation unit 102 may be situated at any suitable distance from the main transportation unit 104.

The packaging system may be at least partially embedded in a supporting frame structure where the main transportation unit 104 and/or one or more of the multiple moveable transportation units 102 are supported on a frame structure.

The linear drives of the main transportation unit 104 and the moveable transportation units 102 may also have their own movement system, so that they can be installed on movement systems such as including and not limited to rails, actuators, motors, or slides, and the like. These movement systems of the moveable transportation units 102 and optionally of the main transportation unit 104 are supported on the frame structure.

In an embodiment, for protection and support, execution of the whole packaging system is installed with the frame structure, where the movement system of the linear drives, such as slides are integrated with the frame structure and the movement systems can be moved on the frame structure.

In another aspect of the present invention, a method for assembling a package comprises a step of providing one or more packaging material components onto a 3-dimensionally moveable closed loop transportation unit 102, and a step of transporting the packaging components to a main transportation unit 104 by the moveable closed loop transportation unit 102 for performing packaging process operations on a package, in transit, onto the main transportation unit 104, where the moveable closed loop transportation unit 102 moves in a 3-dimensional way relative to the main transportation unit 104.

In an embodiment, the step providing one or more packaging material components or the step of performing packaging process operations comprises (i) supplying and/or assembling a packaging material component such as a partition, a handle, a panel, a lid, (ii) supplying and/or loading one or more primary articles into a secondary packaging, (iii) moving one or more packaging components or part of it into a given direction, (iv) fixing one or more packaging components to the given package in assembly, (v) rotating the package in assembly or the final assembled package, (vi) inspecting and or coding a package, and all combinations thereof.

Advantageously, the system of the present invention provides an integrated amalgamation of linear motors, inductive power, wireless machine automation, robotics and bespoke tooling assemblies which in essential combination enable freedom of package design and "agile flexibility at capacity" via programmable dynamic manufacturing processes (secondary packaging assembly while in transit) covering exceptionally wide ranges of packaging and products, size, shape, format, component, and assembly sequences, without necessitating the exchange of package specific parts (e.g., mover and tools) and thus improving productivity while facilitating product diversity.

The present invention provides an amalgamation of independent 3-dimensionally moveable transportation units, custom robotics, wireless machine automation and contactless power supplies to realize synchronized, highly flexible, large range, custom manufacturing operations at capacity, while in transit.

Furthermore, the present invention provides a principle architecture of the overall packaging machine being a compact, adaptive packaging system that have digitalized solutions, while eliminating the need for change in parts (e.g., mover and tools) and in strong support of tooling adaptability and optimizable, software driven flexibility.

A fundamental enabler in the present invention is the realization of adaptive manufacturing processes in transit. The optimizable manufacturing process being arranged in a multi-module, dynamic, and sequential production process along the route of the main package transportation linear drive and along which the primary product and packaging material components are loaded and packages are assembled. This gives rise to the elimination of an extraordinary degree of package design, format and operational constraints, while conversely enabling exceptional packaging design freedom, operational range, capacity, optimized performance, productivity, and cost of ownership benefits.

Furthermore, since the system of the present invention is highly modular in nature, this modular architecture of the packaging machine enables ease of content selection and layout choices at the time of ordering. Such ease of content selection and choices may give freedom for including or excluding various moveable modules that may be selected or de selected to move about the main transportation system linear drive loop. Additionally, ease of content selection and choices may also allow selecting size of modules which may be likewise adapted to suit, along with easily selecting the modules movement direction about the main transportation system (clockwise or anti-clockwise), selecting of infeed direction (from left or from right) and orientation of discharge module (left, right or straight ahead), among other options which can be easily selected in layout configurations in the present invention.

Further advantageously in the present system, through avoidance of multiple conventional machines to perform the fixed manufacturing operations of the limited ranges of products, plus consideration of infeed and discharge conveying network systems, access isles, packaging material movements, waste removal paths and multiple personnel space, the overall footprint of a single larger machine (of the present system) compared with a network of smaller conventional machines is reduced, i.e., the Production Density is much higher and utilizes volume (packaging hall height) better. In addition to the above, while the single machine not only has a smaller foot print, it also supports a larger array of diverse product and package configurations than what a series of conventional machines could practically achieve and in an updatable, flexible, upgradable, and adaptable manner.

Additionally, the aforementioned "Range" is achieved without necessitating change in parts (e.g., mover and tools), while maintaining automated changeover of programmable, software-controlled devices. Changeovers can therefore be executed within minutes, achieving significant reductions in non-productive changeover time, thus increasing productivity. With the automated, digitalized solution described above, coordinated changeovers on the fly may also be realized, achieving almost negligible productivity impact due to packaging line changeover.

Also, with the automated, digitalized solution described above, the system lends itself to enhanced condition monitoring and when combined with appropriate data analysis, to the realization of cost-effective preventative maintenance, further ensuring superior uptime (reliability) of the machine.

What is claimed is:

1. A system comprising three moveable closed loop transportation units and a main transportation unit,
    wherein the three moveable closed loop transportation units envelop the main transportation unit from three sides,
    wherein the three moveable closed loop transportation units are adapted for providing one or more packaging material components to a main transportation unit and/or performing packaging process operations to a given package in assembly present at the main transportation unit, wherein the three moveable closed loop transportation units are independently and 3-dimensionally moveable relative to the main transportation unit, and
    wherein a control system enables the control of 3-dimensional movement of the three moveable closed loop transportation units for simultaneously providing one or more packaging material components to the given package in assembly and/or simultaneously providing packaging process operations to the given packaging in assembly.

2. The system according to claim 1, wherein each of the three moveable transportation units comprises a number of tools mounted on independently motion controlled movers, the number of tools providing the one or more packaging material components to the given package in assembly and/or providing the packaging process operations to the given packaging in assembly.

3. The system according to claim 2 wherein the number of tools are wirelessly controllable and/or wireless powered.

4. The system according to claim 1, wherein the control system is configured to enable synchronization of a pace and pitch of a number of tools with the transportation of the package in assembly on the main transportation unit.

5. The system according to claim 1, wherein the control system is configured to enable the control of the 3-dimensional movement of the three moveable transportation units relative to the package in assembly.

6. The system according to claim 1, wherein the main transportation unit comprises a number of tools on individually motion controlled movers providing packaging process operations to the given packaging in assembly, and wherein the control unit enables the control of the 3-dimensional movement of one or more of the three moveable closed loop transportation units, and the main transportation unit, and its respective number of tools on individually motion-controlled movers for simultaneously providing one or more packaging material components to said given package in assembly and/or simultaneously providing packaging process operations to said given packaging in assembly.

7. A packaging machine for assembling a packaging comprising a system, wherein the system comprises three moveable closed loop transportation units and a main transportation unit,
    wherein the three moveable closed loop transportation units envelop the main transportation unit from three sides,
    wherein the three moveable closed loop transportation units are adapted for providing one or more packaging material components to a main transportation unit and/or performing packaging process operations to a given package in assembly present at the main transportation unit, wherein the three moveable closed loop transportation units are independently and 3-dimensionally moveable relative to the main transportation unit, and
    wherein a control system enables the control of the 3-dimensional movement of the three moveable closed loop transportation units for simultaneously providing one or more packaging material components to the given package in assembly and/or simultaneously providing packaging process operations to the given packaging in assembly.

8. A method for assembling a package comprising providing one or more packaging material components onto three 3-dimensionally moveable closed loop transportation unit, transporting the component to a main transportation unit by the three moveable closed loop transportation units, and moving the three moveable closed loop transportation units independently and in a 3-dimensional way relative to the main transportation unit,
    wherein the three moveable closed loop transportation units envelop the main transportation unit from three sides, and
    wherein a control system enables the control of 3-dimensional movement of the three moveable closed loop transportation units for simultaneously providing one or more packaging material components to a given package in assembly and/or simultaneously providing packaging process operations to the given packaging in assembly.

9. A method for assembling a package comprising providing a given package in assembly onto a main transportation unit, performing packaging process operations to the given package in assembly by three moveable closed loop transportation units, and moving the three moveable closed loop transportation units independently and in a 3-dimensional way relative to the main transportation unit, wherein the three moveable closed loop transportation units envelop the main transportation unit from three sides, and wherein a control system enables the control of 3-dimensional movement of the moveable closed loop transportation units for simultaneously providing one or more packaging material components to the given package in assembly and/or simultaneously providing packaging process operations to the given packaging in assembly.

10. The method for assembling a package in accordance with claim 8 wherein providing one or more packaging material components or the step of performing packaging process operations comprises (i) supplying and/or assembling a packaging material component such as a partition, a handle, a panel, a lid, (ii) supplying and/or loading one or more primary articles into a secondary packaging, or supplying and/or loading one or more secondary packages into a tertiary packaging, (iii) moving one or more of the packaging material components or part of it into a given direction, (iv) fixing one or more of the packaging material components to the given package in assembly, (v) rotating the package in assembly or a final assembled package, (vi) inspecting and or coding a package, (vii) accelerating, decelerating, cutting, stretching, compressing, collapsing, folding, erecting, gluing, decorating the material component of a package in assembly, and all combinations thereof.

11. A system comprising three moveable closed loop transportation units and a main transportation unit, wherein the three moveable closed loop transportation units envelop the main transportation unit from three sides, wherein the three moveable closed loop transportation units are adapted for providing one or more article component to the main transportation unit and/or performing process operations to a given article in assembly present at the main transportation unit, wherein the moveable closed loop transportation units are independently and 3-dimensionally moveable relative to the main transportation unit, wherein a control system enables the control of 3-dimensional movement of the three moveable closed loop transportation units for simultaneously providing one or more packaging material components to the given package in assembly and/or simultaneously providing packaging process operations to the given packaging in assembly.

12. A machine for assembling an article comprising at least a system, wherein the system comprises three moveable closed loop transportation units and a main transportation unit, wherein the three moveable closed loop transportation units envelop the main transportation unit from three sides, wherein the three moveable closed loop transportation units are adapted for providing one or more article component to the main transportation unit and/or performing process operations to a given article in assembly present at the main transportation unit, wherein the three moveable closed loop transportation units are independently and 3-dimensionally moveable relative to the main transportation unit, and wherein a control system enables the control of the 3-dimensional movement of the three moveable closed loop transportation units for simultaneously providing one or more packaging material components to the given package in assembly and/or simultaneously providing packaging process operations to the given packaging in assembly.

* * * * *